United States Patent [19]

Nishizawa et al.

[11] Patent Number: 4,903,938
[45] Date of Patent: Feb. 27, 1990

[54] MICRO FLOW CONTROL VALVE

[75] Inventors: Jun-ichi Nishizawa; Shinzo Kasai; Tetsuo Okada, all of Sendai; Mitsuhiko Dohzono, Izumi, all of Japan

[73] Assignee: JGC Corp., Tokyo, Japan

[21] Appl. No.: 179,942

[22] Filed: Apr. 11, 1988

[30] Foreign Application Priority Data

Apr. 13, 1987 [JP] Japan ................................. 62-90094
Apr. 13, 1987 [JP] Japan ................................. 62-90095

[51] Int. Cl.$^4$ ........................... F16K 1/36; F16K 1/42
[52] U.S. Cl. ............................. 251/61.5; 251/129.16; 251/333; 251/368; 251/359
[58] Field of Search ...................... 251/61.5, 368, 333, 251/129.16, 359

[56] References Cited

U.S. PATENT DOCUMENTS 3,512,550  5/1970  Ammann ................. 251/61.5 X
4,245,815  1/1981  Willis .
4,313,570  2/1982  Olsen ....................... 251/61.5 X

FOREIGN PATENT DOCUMENTS 0107445  2/1984  European Pat. Off. .
 855117  11/1960  United Kingdom .
1377873  12/1974  United Kingdom .
1518827   7/1978  United Kingdom .

Primary Examiner—Arnold Rosenthal
Attorney, Agent, or Firm—Varndell Legal Group

[57] ABSTRACT

Disclosed is a micro gas flow rate control valve which is used in semi-conductor producing system operated under a high vacuum or various apparatus for analysis. The valve uses combination of a flat surface valve tip and a flat surface valve seat of cylindrical shape, and is capable of controlling minute flow and durable even used under severe conditions of high pressure differences and large temperature changes to have stable performance. Also enclosed is a metal-ceramics sealing mechanism suitable for the above valve. The sealing mechanism uses, in addition to a sealing member made of a soft metal, a seal assisting member, and durable under the conditions of repeated temperature changes.

7 Claims, 5 Drawing Sheets

MICRO FLOW CONTROL VALVE

BACKGROUND OF THE INVENTION

1. Field of the Invention

This invention relates to improvement of a micro gas flow control valve used in semi-conductor producing system operated under a high vacuum, and in various apparatus for analysis. The valve of this invention uses an improved sealing mechanism between a metal member and a ceramics member, which can be used under the condition of repeated temperature changes.

2. State of the Art

Recently, semi-conductor producing system are operated under a high vacuum condition, and fine control of small amount of gases such as helium, argon, oxygen and various organo-metallic compounds supplied to the installation has become important.

As illustrated in FIG. 5, when a gas under a considerable pressure from pressure vessel such as bomb B is supplied to a semi-conductor producing installation D which is maintained at a high vacuum, pressure difference of primary pressure and secondary pressure at the flow control valve V is very large. In addition to this pressure difference, there is large temperature changes during operation of the system, which occur repeatedly. Thus, it is required that the flow control valves used under these severe conditions have high level performance to precisely control minute flow of gas and stability in working.

In order to reluxate the conditions, it has been proposed, as illustrated in FIG. 6, to install a pressure reduction chamber PD before the flow control valve V and to introduce the gas firstly in this chamber which is maintained at a semi-vacuum pressure so that the pressure difference may be reduced. This is of course not convenient, and it is preferable to introduce the gas directly into the semi-conductor producing system from the vessel.

Hitherto, micro flow control valves are of needle type or flat surface valve tip type. As is well known, the valves of the needle type use combination of a needle and an O-ring, and the valves of the flat surface valve tip type comprise, as illustrated in FIG. 4, a valve tip with smooth flat surface made of a hard metal and a lip-shaped valve seat made of a soft metal.

The needle type valves have a drawback that dust occurs due to friction between the needle and the O-ring, and have only limited use in semi-conductor producing installation. As for the valves with a smooth flat surface valve tip, the soft metal valve seat deforms due to pressure given by the had metal valve tip to conform with the shape of the mating member, and minute control is possible. As the deformation proceeds, however, the rate of gas flow will change, and if the deformation becomes to the extremity, the surface pressure will decrease to cause leak of gas. Therefore, the duration is short.

With respect to the sealing mechanism for the above described micro flow control valve, a rubber O-ring, an adhesive or teflon products have been used as sealing members. It has been pointed out that the conventional sealing materials have shortcomings such as outgassing under a high vacuum and poor heat-resistance. As an alternative to these sealing members, O-rings of a soft metal such as gold or silver are used.

However, the soft metal sealing members cannot withstand repeated temperature changes, and the gas leakage tends to increase. This is because thermal expansion of the soft metals is large, and the metal deforms to bulge out into the seal gap at high temperatures and the recovery of the deformation at low temperatures is so incomplete that permanent deformation accumulates.

SUMMARY OF THE INVENTION

The general object of the present invention is to provide a micro gas flow control valve, which is capable of controlling minute flow under a reduced pressure, and is durable even under severe conditions of higher pressure differences and large temperature changes with stability of performance.

The specific object of this invention is to eliminate the above described drawbacks, to absorb the deformation caused by the cycle of the thermal expansion and shrinkage in the soft metal sealing materials, and to provide a sealing mechanism between a metal member and a ceramics member, which displays stable sealing function even under severe conditions of large pressure differences and large temperature differences.

The micro flow control valve of the present invention is a valve comprising a valve tip installed at one end of a stem and a cylindrical valve seat installed at the bottom of a gas chamber, in which a gas flows through the gap between the flat surface of the valve tip and the flat surface of the valve seat to the passageway in the center of the valve seat, characterized in that the valve includes means such as a spring for forcing the stem to the direction in which the valve tip is always pressed against the valve seat, an air chamber, and a diaphragm; that the valve has a pneumatic system, in which the stem is connected to the diaphragm, giving a force against the aforesaid pressing force by air pressure on the diaphragm, and by controlling the pressure in the air chamber to control the pressing force of the valve tip: and that the valve has a driving system to control the gap between the flat surface of the vale tip and the flat surface of the valve seat within the range of elastic deformation of the used materials and without permanent deformation thereof.

The sealing mechanism for metal and ceramics to be used in the valve of this invention is a sealing mechanism used under the condition of repeated temperature changes, which includes a soft metal sealing member inserted in metal parts and ceramic parts, is characterized in that a seal assisting material formed from a material which has a thermal expansion property to compensate the thermal expansion of the soft metal is installed in contact with the seal material.

DRAWINGS

FIG. 3 shows this invention, and FIG. 4, the conventional one.

Figure 7:
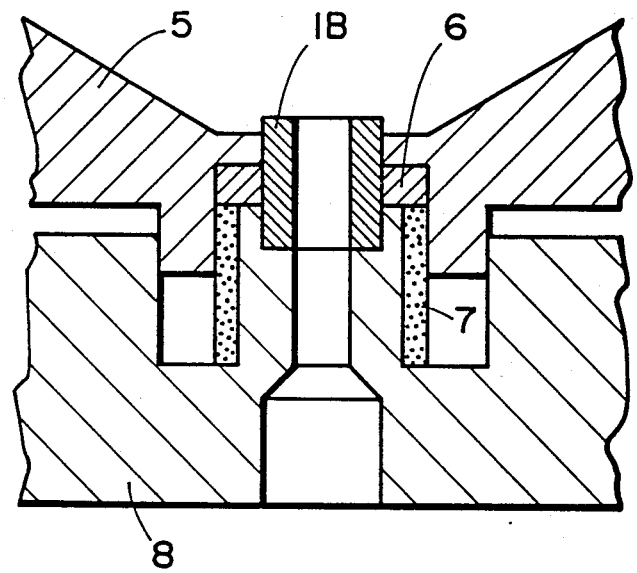
FIG. 7 is an enlarged vertical sectional view of a sealing mechanism of this invention to be used in the micro gas flow control valve.
Figure 8:
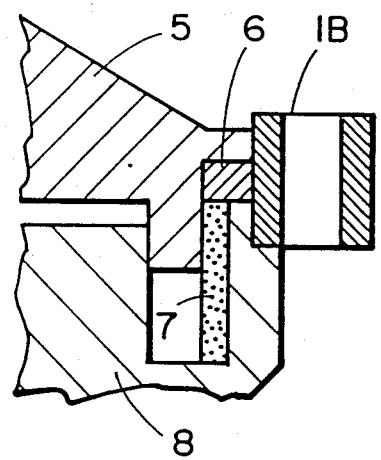
Figure 9:
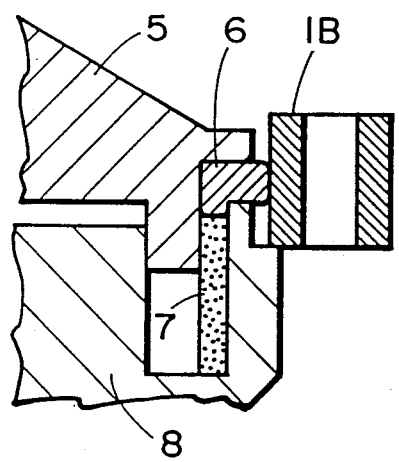
Figure 10:
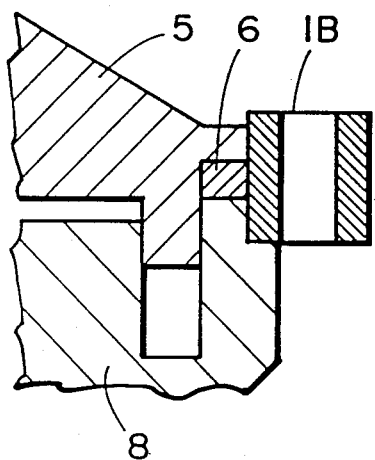

FIG. 8 to FIG. 11 are sectional view corresponding to FIG. 7 for explaining the function of the sealing mechanism of this invention: FIG. 8 showing the state at a room temperature with a seal assisting material installed according to this invention; FIG. 9, the same at a higher temperature; FIG. 10 showing the state at a room temperature with soft metal ring only; and FIG. 11, the same at a higher temperature.

DETAILED EXPLANATION OF PREFERRED EMBODIMENTS

With reference to the attached drawings, examples of the valve of this invention will be explained below.

Figure 1:
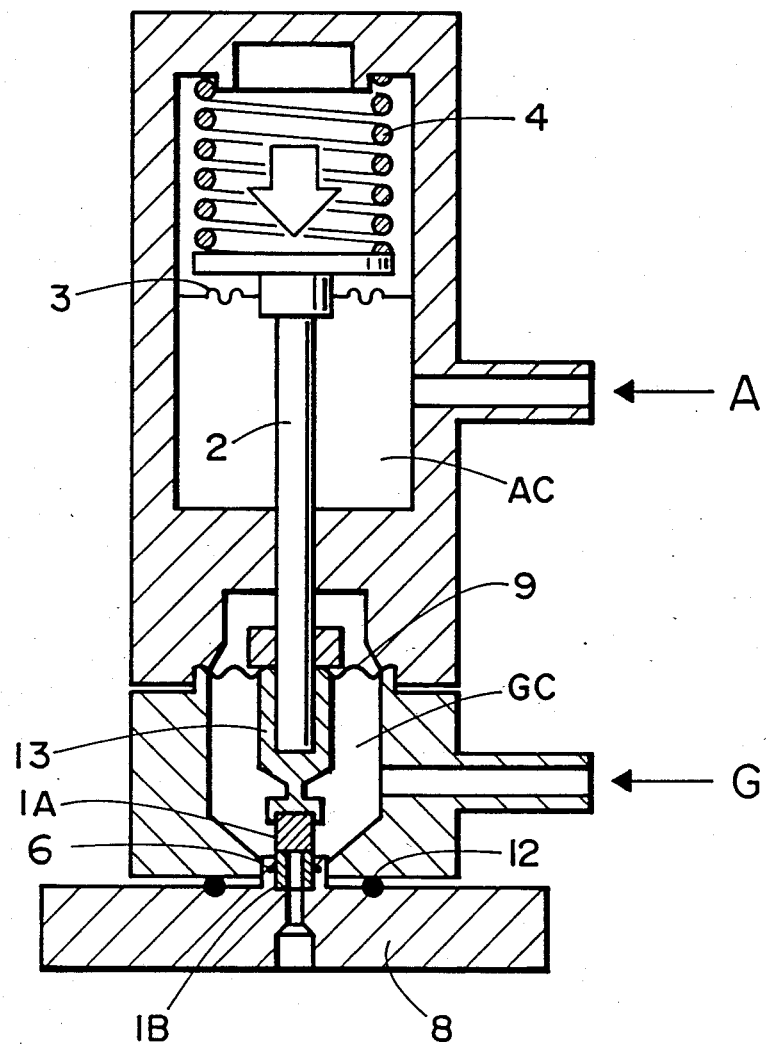
FIG. 1 and FIG. 2 are both vertical sectional view illustrating the whole structure of examples of micro flow control valve according to this invention.
Figure 2:
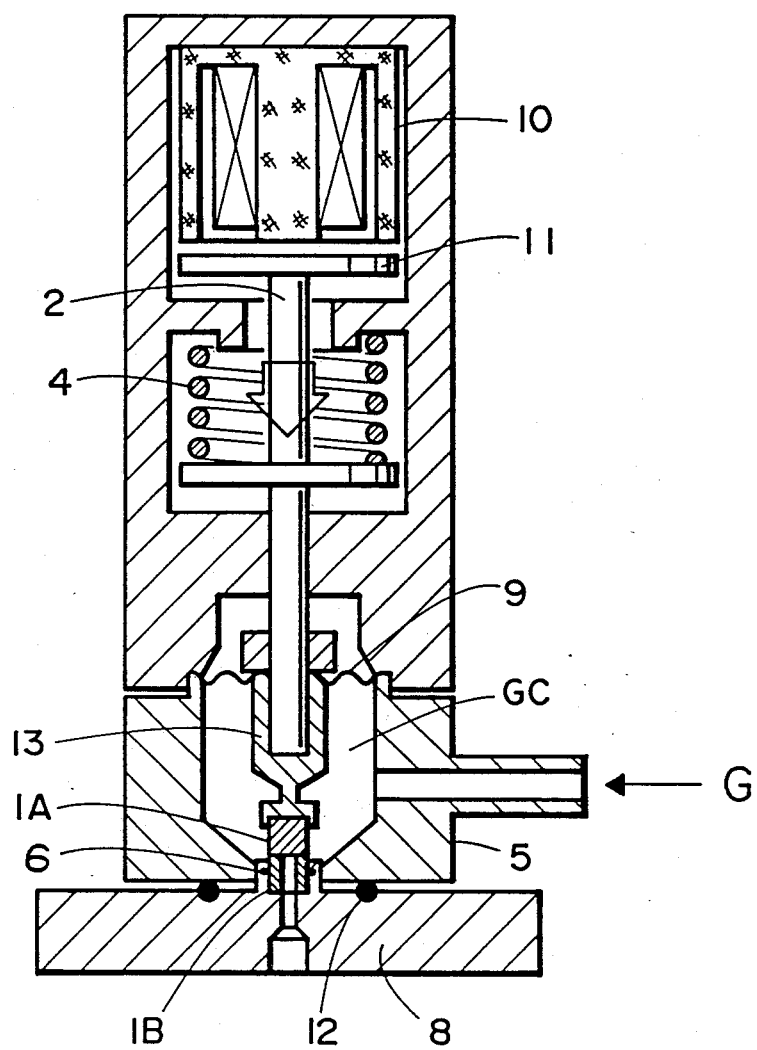

The whole structure of the valve is as illustrated in the vertical sectional view of FIG. 1 and FIG. 2. A small amount of gas introduced into the gas chamber GC flows through the gap between the smooth flat surfaces of valve tip 1A and valve seat 1B, which are made of hard materials (for example, sapphire).

Gas chamber GC is a space partitioned by a metal (for example, SUS 304,316L or Monel metal) diaphragm 9, which provides freeness to the valve tip, and the metal diaphragm 9 maintains air tightness while responding to minute axial movement of the stem. At the bottom end of the stem, which extends through the metal diaphragm 9, a valve tip is installed with the aid of a valve tip supporter. Around the valve seat installed in the bottom of the gas chamber, soft metal (for example, gold) seal ring 6 is used to maintain air tightness.

The part with numeral 8 is a standing base, which connects the valve with a gas receiving apparatus such as semi-conductor producing system or an apparatus for analysis under vacuum condition, and is made of metals (for example, SUS 316L) with high corrosion resistance and low outgassing under vacuum. Other gas contacting parts (gas contacting casing etc.) may be made of similar materials.

The driving system may be pneumatic as illustrated in FIG. 1, or electromagnetic as in FIG. 2. Any other type, for example, electrostriction type, can be used.

Driving force is transmitted to valve body 1A by stem 2. Pressing force is applied to valve body 1A by spring 4. In order to regulate this pressing force, air pressure is applied to diaphragm 3, creating a force in the reverse direction of the force by the spring. In FIG. 2, similar force is created by electric current in an electromagnet to draw magnetic substance 11 such as steel plate near. In a pneumatic system, working air is used after being stabilized and controlled with a pressure reducing system. In an electromagnetic system, electric power should be supplied through a current stabilizer so that stable performance may be persued by utilization of a feedback system with sensors such as a load cell or a strain gauge.

Utilizing the driving system described above, when air pressure or electromagnet is not acting, valve tip 1A is pressed onto valve seat 1B by spring 4 in the pressure range where no permanent deformation occurs, and contacts with minimum gap (around some 10 nm when surface finishing is satisfactory), and therefore, there will be no substantial gas leakage even at a large pressure difference.

Figure 3:
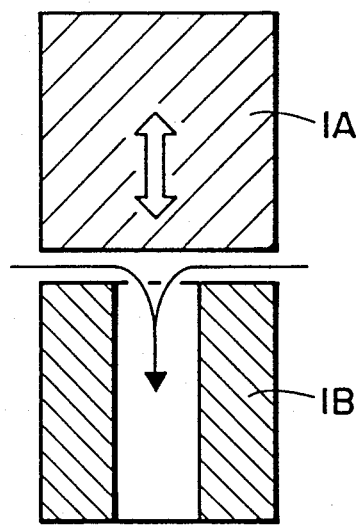
FIG. 3 and FIG. 4 are sectional views comparing structures of valve tip and valve seat of this valve and a conventional valve.
Figure 4:
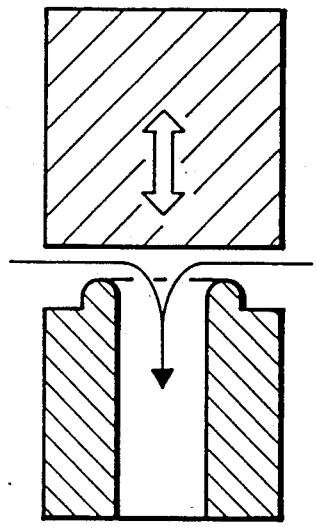
Figure 5:
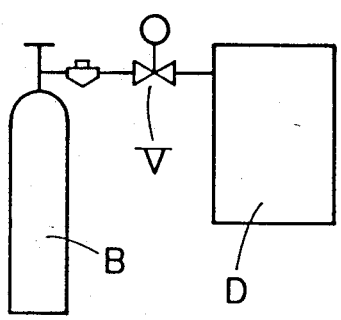
FIG. 5 and FIG. 6 illustrate connection of a vacuum equipment with a pressure vessel such as a gas bomb, which is the source of supply gas.
Figure 6:
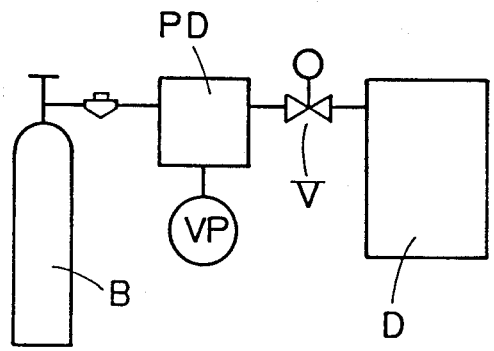

On the other hand, when a force reverse to the pressing force is applied in accordance with the desired gas flow rate, the gap formed by the flat surface of the valve body and the flat surface of the valve seat will increase accordingly, as illustrated in FIG. 3, whereby causing increase of the gas flow rate.

Metal diaphragm 9, gas contacting casing 5, and valve body supporter 13 prevent gas leakage by surface contact (surface roughness: about 1 micron).

Valve tip 1A and valve seat 1B, one or both, (preferably, both) of them are made of a hard gem stone such as sapphire, sintered oxide, sintered nitride, or a material with hard surface made by ion-plating on a metal. It is preferable to finish the surface as smooth as possible to lower the roughness to 50 nm or less. One of valve tip 1A and valve seat 1B can be made of a hard metal such as titanium.

Rubber seal ring 12 is to prepare for the case of leakage between soft metal seal ring 7 and valve seat 1B.

This invention with the above described structure completely solved the problems of conventional micro flow control valves. The micro flow control valve according to this invention, by employing a hard gem stone, a sintered oxide, a sintered nitride, an ion-plated metal or a hard metal as the valve tip material and the valve seat material, at least for hard gem stone highly smooth surface with roughness below 50 nm being prepared, and with minute gap they constitute, enables minimum gas leakage and minute flow control.

Because a soft metal is not used for the valve seat in this invention, the durability of the valve is increased and the stable performance is maintained for a long period. Thus, necessity of maintenance will be reduced.

FIG. 7 illustrates·one example of the sealing mechanism. This sealing mechanism has a ceramics valve seat 1B in the center of the bottom of the gas casing 5, a soft metal (for example, gold) ring 6 inserted between said casing and the standing base 8, and a cylindrical seal assisting material 7 made of, for example, amber (Fe-Ni low thermal expansion alloy) behind said ring.

A typical soft metal used as the sealing material is gold. Also, indium, copper, silver and aluminum can be use.

When a stainless steel is used for the metal parts, Fe-Ni low expansion alloy is suitable as the seal assisting material. There are low thermal expansion alloys with different thermal expansion coefficients owing to the alloy compositions, and a suitable alloy can be chosen from them to meet the using condition.

In the sealing mechanism according to this invention, the sealing is accomplished as illustrated in FIG. 8 at a room temperature. When the temperature rises, thermal expansion of all the parts takes place and, as illustrated in FIG. 9, sealing is sustained by expanded sealing material which extends out into the enlarged seal gap. Because the thermal expansion of the seal assisting material is small, the sealing material also extends towards the seal assisting material to fill the space formed by differences in expansion. Therefore, the degree of bulging out of the sealing material between valve seat 1B and metal parts 5, 8 is small. The degree of deformation of the sealing material is smaller when compared with that in FIG. 11, and accumulation of the deformation by repeated temperature changes is considerably small.

In this way, sealing for the ceramics valve seat can be kept under a complete condition for a long term.

Figure 11:
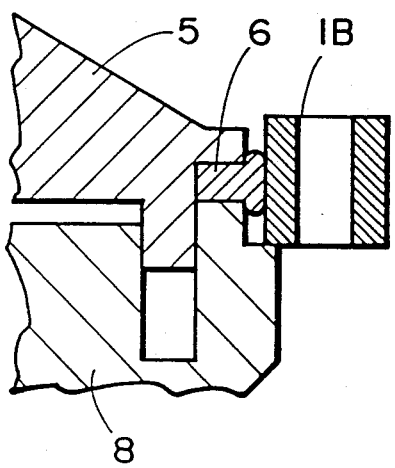

When a seal assisting material of this invention is not used and only a gold ring is used, sealing is accomplished at a room temperature as illustrated in FIG. 10, but at a higher temperature the situation changes to FIG. 11. All parts constituting the sealing mechanism undergo thermal expansion, and if the thermal expansion coefficients are: $\alpha_1$ for the metal parts, $\alpha_2$ for the sealing material, and $\alpha_3$ for the ceramics, the relation of them is:

$$\alpha_2 > \alpha_1 > \alpha_3.$$

The seal gap between the ceramics valve seat and the metal parts 5 and 8 increases with rise of temperature, and the sealing material which has the highest thermal expansion coefficient expands to sustain the seal. When the temperature falls, the sealing material recovers its original shape, because it is a soft material. With the conventional structure, small deformations accumulated by repeated temperature changes will lead to failure of complete sealing.

The problem mentioned above has been solved by this invention. For seals practically used between a metal member and a ceramics member, sealing mechanism of this invention can retain the completeness of sealing even under repeated temperature changes.

Leakage of the micro flow control valve of this invention is, at a room temperature, $1 \times 10^{-9}$ Atm cc/sec (He gas) or less, and no change is appreciable after 5000 cycles of closed $1 \times 10^{-9}$-open $5 \times 10^{-7}$ Atm cc/sec (He gas). The range of flow control, when open, is $5 \times 10^{-8}$-$1 \times 10^{-5}$ Atm cc/sec (He gas). At the closed position it is durable at an input pressure up to 10 kg/cm$^2$G.

The valve of this invention, after enduring 5000 close - open tests, prooved to have no scratches on valve body and valve seat surfaces. This demonstrates that the use within elastic deformation of flat surface valve seats is advantageous.

What is claimed is:

1. A micro flow control valve comprising a valve tip installed at one end of a stem, a cylindrical valve seat installed at the bottom of a gas chamber, the valve tip and the cylindrical valve seat each having a flat surface, the flat surfaces being arranged to provide a gap therebetween for a gas to flow into a passageway in the center of the valve seat;

a driving system for controlling the gap within a range of elastic deformation of the valve tip and valve seat and without permanent deformation thereof, the driving system including pressing means for pressing the valve against the valve seat, and reverse forcing means for providing a controllable force against the pressing of the valve against the valve seat and for opening the gap;

the reverse forcing means including a pneumatic system having an air chamber, a diaphragm connected to the stem, and means for controlling the air pressure within the air chamber and on the diaphragm; and the pressing means and reverse force means being arranged so than an amount of opening of the gap can be controlled independently of the pressure of gas flowing through the gap.

2. A micro gas valve according to claim 1, wherein at least one of the valve tip and the valve seat is made of gem stone and the flat surfaces are hard smooth surfaces.

3. A micro gas valve according to claim 1, wherein the valve tip and the valve seat are made of sapphire.

4. A micro gas valve according to claim 1, wherein at least one of the valve tip and the valve seat are made of a material selected from the group consisting of a sintered oxide, a sintered nitride and a sintered carbide, and the flat surfaces are hard smooth surfaces.

5. A micro gas valve according to claim 1, wherein at least one of the valve tip and the valve seat are made of a material selected from the group consisting of a hard oxide, carbide and nitride and the flat surfaces are hard smooth surfaces.

6. A micro gas flow control valve according to claim 1, wherein the reverse forcing means is arranged to act on another end of the stem for controlling the gap.

7. A micro gas flow control valve according to claim 1, wherein the pressing means and reversing forcing means are both arranged to act on another end of the stem for controlling the gap.

* * * * *